(12) United States Patent
Vacchi et al.

(10) Patent No.: US 12,175,401 B2
(45) Date of Patent: Dec. 24, 2024

(54) SEGMENTING PROCESSES INTO STAND-ALONE SERVICES

(71) Applicant: Red Hat, Inc., Raleigh, NC (US)

(72) Inventors: Edoardo Vacchi, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 191 days.

(21) Appl. No.: 17/752,546

(22) Filed: May 24, 2022

(65) Prior Publication Data
US 2023/0385730 A1    Nov. 30, 2023

(51) Int. Cl.
G06Q 10/0631    (2023.01)

(52) U.S. Cl.
CPC . G06Q 10/06316 (2013.01); G06Q 10/06315 (2013.01)

(58) Field of Classification Search
CPC ............ G06Q 10/0633; G06Q 10/067; G06Q 10/06316; G06Q 10/103; G06Q 10/06375; H04L 67/34; H04L 67/1031; H04L 41/145; H04L 41/0813; H04L 67/10; H04L 41/5009; H04L 41/5029; H04L 41/0895
See application file for complete search history.

(56) References Cited

U.S. PATENT DOCUMENTS

| | | | | |
|---|---|---|---|---|
| 8,219,440 B2 * | 7/2012 | Bhandari | ............... | G06Q 10/00 705/7.39 |
| 8,332,864 B2 * | 12/2012 | Bose | ...................... | G06Q 10/06 718/100 |
| 8,386,524 B2 * | 2/2013 | Abrahams | ............... | G06F 16/20 707/804 |
| 9,213,582 B2 * | 12/2015 | Narendra | ............... | G06F 9/5072 |
| 9,558,441 B2 * | 1/2017 | Bachelor | ................ | G06F 9/4843 |
| 9,773,218 B2 * | 9/2017 | Brown | ............. | G06Q 10/06316 |
| 10,158,725 B2 * | 12/2018 | Narendra | .............. | H04L 41/052 |
| 10,395,205 B2 * | 8/2019 | Addala | ................ | G06Q 10/067 |
| 10,789,089 B2 * | 9/2020 | Hari | .................... | G06Q 30/0283 |

(Continued)

OTHER PUBLICATIONS

Povoa, Lucas Venezian et al., An Approach to the Decomposition of Business Processes for Execution in the Cloud 2014 IEEE/ACS 11th International Conference on Computer Systems and Applications (AICCSA), 2014 (Year: 2014).*

(Continued)

*Primary Examiner* — Scott L Jarrett
(74) *Attorney, Agent, or Firm* — Dority & Manning, P.A.

(57) ABSTRACT

In various examples disclosed herein, provided is a method for segmenting processes into stand-alone services. The method can include receiving a file that includes information relating to a plurality of components. The method can also include determining a first resource cost associated with deploying each component in a respective service and a second resource cost associated with deploying each component in a single service. The method can also include determining a segmentation plan that segments the plurality of components into groups of one or more components that can be executed by respective services, where a third resource cost associated with the segmentation plan is lower than the first resource cost and the second resource cost. The method can also include generating instructions to deploy the respective services on the one or more computing devices.

20 Claims, 8 Drawing Sheets

(56) References Cited

U.S. PATENT DOCUMENTS

| | | | | |
|---|---|---|---|---|
| 10,977,083 | B2* | 4/2021 | Hari | G06Q 30/0206 |
| 11,281,499 | B2* | 3/2022 | Bartfai-Walcott | H04L 67/10 |
| 11,663,047 | B2* | 5/2023 | Bartfai-Walcott | G06F 9/5061 |
| | | | | 709/223 |
| 11,750,688 | B2* | 9/2023 | Ritter | G06Q 10/04 |
| | | | | 705/7.35 |
| 2006/0041643 | A1* | 2/2006 | Fanshier | G06F 8/61 |
| | | | | 709/220 |
| 2006/0080413 | A1* | 4/2006 | Oprea | G06F 8/61 |
| | | | | 709/220 |
| 2008/0320486 | A1* | 12/2008 | Bose | G06Q 10/06 |
| | | | | 718/105 |
| 2009/0089115 | A1* | 4/2009 | Murthy | G06Q 10/0633 |
| | | | | 705/7.27 |
| 2009/0138273 | A1* | 5/2009 | Leung | G06Q 10/067 |
| | | | | 705/348 |
| 2012/0259898 | A1* | 10/2012 | Sengupta | G06F 16/84 |
| | | | | 707/804 |
| 2012/0259909 | A1* | 10/2012 | Bachelor | G06Q 10/06 |
| | | | | 709/201 |
| 2012/0310681 | A1* | 12/2012 | Simon | G06Q 10/067 |
| | | | | 705/7.11 |
| 2013/0006887 | A1* | 1/2013 | Balko | G06Q 10/00 |
| | | | | 705/348 |
| 2013/0232463 | A1* | 9/2013 | Nagaraja | G06F 8/70 |
| | | | | 717/101 |
| 2013/0232498 | A1* | 9/2013 | Mangtani | G06F 9/5077 |
| | | | | 718/104 |
| 2015/0039379 | A1* | 2/2015 | Brown | G06Q 10/06316 |
| | | | | 705/7.26 |
| 2020/0050494 | A1* | 2/2020 | Bartfai-Walcott | G06F 9/5083 |
| 2020/0073717 | A1* | 3/2020 | Hari | G06F 9/5061 |
| 2020/0089515 | A1* | 3/2020 | Hari | G06N 3/02 |
| 2020/0106711 | A1* | 4/2020 | Sok | H04L 47/70 |
| 2021/0019070 | A1* | 1/2021 | Karr | G06F 3/0664 |
| 2021/0406798 | A1* | 12/2021 | Sethi | G06Q 10/06315 |
| 2023/0028947 | A1* | 1/2023 | Ritter | G06Q 10/04 |
| 2023/0281212 | A1* | 9/2023 | Zorin | G06F 16/254 |
| | | | | 707/602 |

OTHER PUBLICATIONS

Martins, Francisco et al., Automatic Decomposition of IoT Aware Business Processes with Data and Control Flow Distribution in Proceedings of the 21st International Conference on Enterprise Information Systems (ICEIS 2019), (Year: 2019).*

Ferme, Vincenzo et al., Estimating the Cost for Executing Business Processes in the Cloud International Conference on Business Process Management, 2016 (Year: 2016).*

Halima, Rania Ben et al., Toward a correct and optimal time-aware cloud resource allocation to business processes Future Generation Computer Systems, vol. 112, 2020 (Year: 2020).*

Pufahl, Luise et al., Automatic Resource Allocation in Business Processes: A Systemic Literature Survey ACM, 2021 (Year: 2021).*

Mastelic, Toni et al., Predicting Resource Allocation and Costs for Business Processes in the Cloud IEEE 11th World Congress on Services, 2015 (Year: 2015).*

Byun, Eun-Kyu et al., Cost optimized provisioning of elastic resources for application workflows Future Generation Computer Systems, vol. 27, 2011 (Year: 2011).*

Duipmans, Evert F., Business Process Management in the Cloud with Data and Activity Distribution Universite of Twente, Sep. 2012 (Year: 2012).*

Duipmans, E.F. et al., "A Transformation-Based Approach to Business Process Management in the Cloud," Journal of Grid Computing, vol. 12, No. 2, Oct. 2013, Springer Science+Business Media Dordrecht, pp. 191-219.

Povoa, L.V. et al., "An Approach to the Decomposition of Business Processes for Execution in the Cloud," 2014 IEEE/ACS 11th International Conference on Computer Systems and Applications (AICCSA), Nov. 2014, Doha, Qatar, IEEE, 9 pages.

* cited by examiner

SEGMENTING PROCESSES INTO STAND-ALONE SERVICES

BACKGROUND

Business automation is a technological area of growing interest and importance that facilitates the implementation of a business application on a computing system via a standardized notation system.

SUMMARY

In various examples disclosed herein, provided is a method and system for segmenting components associated with business process automation files into stand-alone services to more efficiently and optimally execute the processes. The files, or business assets, can include one or more components that comprise processes to be executed at runtime in a cloud computing environment. In order to reduce the computing resources required to execute the processes, and instead of executing all the processes in respective services, or all the processes in a single service, the components and their respective processes can be segmented to both reduce computational overhead costs, and achieve economies of scale.

In an example, a method includes receiving, by a computing system comprising one or more processor devices of one or more computing devices, a file including information relating to a plurality of components. The method also includes determining a first resource cost associated with deploying each component of the plurality of components in a respective service on the one or more computing devices. The method also includes determining a second resource cost associated with deploying each component in a single service on a computing device of the one or more computing devices. The method also includes determining a segmentation plan that segments the plurality of components into groups of one or more components where each group of one or more components of the groups of one or more components can be executed by respective services deployed on the one or more computing devices, wherein a third resource cost associated with the segmentation plan is lower than the first resource cost and the second resource cost. The method also includes generating instructions to deploy the respective services on the one or more computing devices.

In an example, a computing system includes one or more computing devices, the one or more computing devices including one or more processor devices, the one or more processor devices to receive a file including information relating to a plurality of components. The processor devices also determine a first resource cost associated with deploying each component in a respective service on the one or more computing devices. The processor devices also determine a second resource cost associated with deploying each component of the plurality of components in a single service on a computing device of the one or more computing devices. The processor devices also determine a segmentation plan that segments the plurality of components into groups of one or more components where each group of one or more components of the groups of one or more components can be executed by respective services deployed on the one or more computing devices, wherein a third resource cost associated with the segmentation plan is lower than the first resource cost and the second resource cost. The processor devices also generate instructions to deploy the respective services on the one or more computing devices.

In an example, a non-transitory computer-readable storage medium includes executable instructions to cause one or more processor devices of one or more computing devices to receive a file comprising information relating to a plurality of components. The instructions further cause the one or more processor devices to determine a first resource cost associated with deploying each component of the plurality of components in a respective service on the one or more computing devices. The instructions further cause the one or more processor devices to determine a second resource cost associated with deploying each component in a single service on a computing device of the one or more computing devices. The instructions further cause the one or more processor devices to determine a segmentation plan that segments the plurality of components into groups of one or more components where each group of one or more components of the groups of one or more components can be executed by respective services deployed on the one or more computing devices, wherein a third resource cost associated with the segmentation plan is lower than the first resource cost and the second resource cost. The instructions further cause the one or more processor devices to generate instructions to deploy the respective services on the one or more computing devices.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but, unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

The term "business automation" as used herein refers to the use of predetermined modeling systems and notation systems that facilitate the modeling of business processes and/or decision services for visualization purposes, and also facilitate the implementation of such business processes and decision services through software instructions that, when interpreted, or compiled and executed, implement a desired business system on one or more computing devices.

Business process modeling is the activity of representing the processes of an enterprise, where the processes can be a series of tasks, events, conditions, and other activities that are recorded and tracked in a manner that can enable analysts to better understand the systems and operations of the enterprise. There are many different methodologies and notation systems that can be used to track, model, and simulate the processes, and, in a cloud-oriented business process automation platform, these can lead to a large set of heterogenous source files that are not necessarily interoperable. Even files that use the same methodology or notation system may not be interoperable since the files may contain references to different files that are not compatible.

During business process modeling, the operational specifications of business processes can be captured, and the data of business processes, known as "artifacts," can be described by characterizing business-relevant data objects, their lifecycles, and related services. Business process modeling tools provide business users with the ability to model their business processes, implement and execute those models, and refine the models based on as-executed data. As a result, business process modeling tools can provide transparency into business processes, as well as the centralization of corporate business process models and execution metrics. The business process modeling tools can also enable simulation functionality that allows for pre-execution modeling and simulation to explore "what-if" scenarios with different inputs. Once the modeling and simulation is performed, the files comprising the processes can be utilized at runtime or when performing business process automation.

Examples of such modeling systems and notation systems include, by way of non-limiting example, Business Process and Model Notation (BPMN), available at www.omg.org, Decision Model and Notation (DMN), available at www.omg.org, Predictive Model Markup Language (PMML), available at www.dmg.org, and Drools Rules Language (DRL), available at www.drools.org. Generally, a file utilizing a modeling system and a notation system will be referred to herein collectively as a business asset. Each business asset may comprise an individual file that describes and contains software instructions to implement one or more components, such as processes or decision services, and instructions suitable for visualizing in a user interface the one or more components that are implemented by the business asset. Together, a related collection of business assets implements a particular business application that can execute on one or more computing systems to provide desired functionality.

In various examples disclosed herein, provided is a method and system for segmenting components associated with business process automation files into stand-alone services to more efficiently and optimally execute the processes. The files, or business assets, can include one or more components that comprise processes to be executed at runtime in a cloud computing environment. In order to reduce the computing resources required to execute the processes, instead of executing all the processes in respective services, or all the processes in a single service, the components and their respective processes can be segmented to both reduce computational overhead costs, and achieve economies of scale.

With a naïve segmentation strategy, or where each individual process is being executed by a single service, the resource cost in server time, bandwidth, or other computational metric can be high, as there are overhead computational resources utilized by services, whether they are active or not. Likewise, if all the processes in a business process are being executed by a single service, that single service could require a lot of computational resources, even if individual processes are not frequently being called upon. Instead, by segmenting the processes into groups of one or more processes, where each group of one or more processes are executed by a respective service, fewer computational resources may be required.

Figure 1:
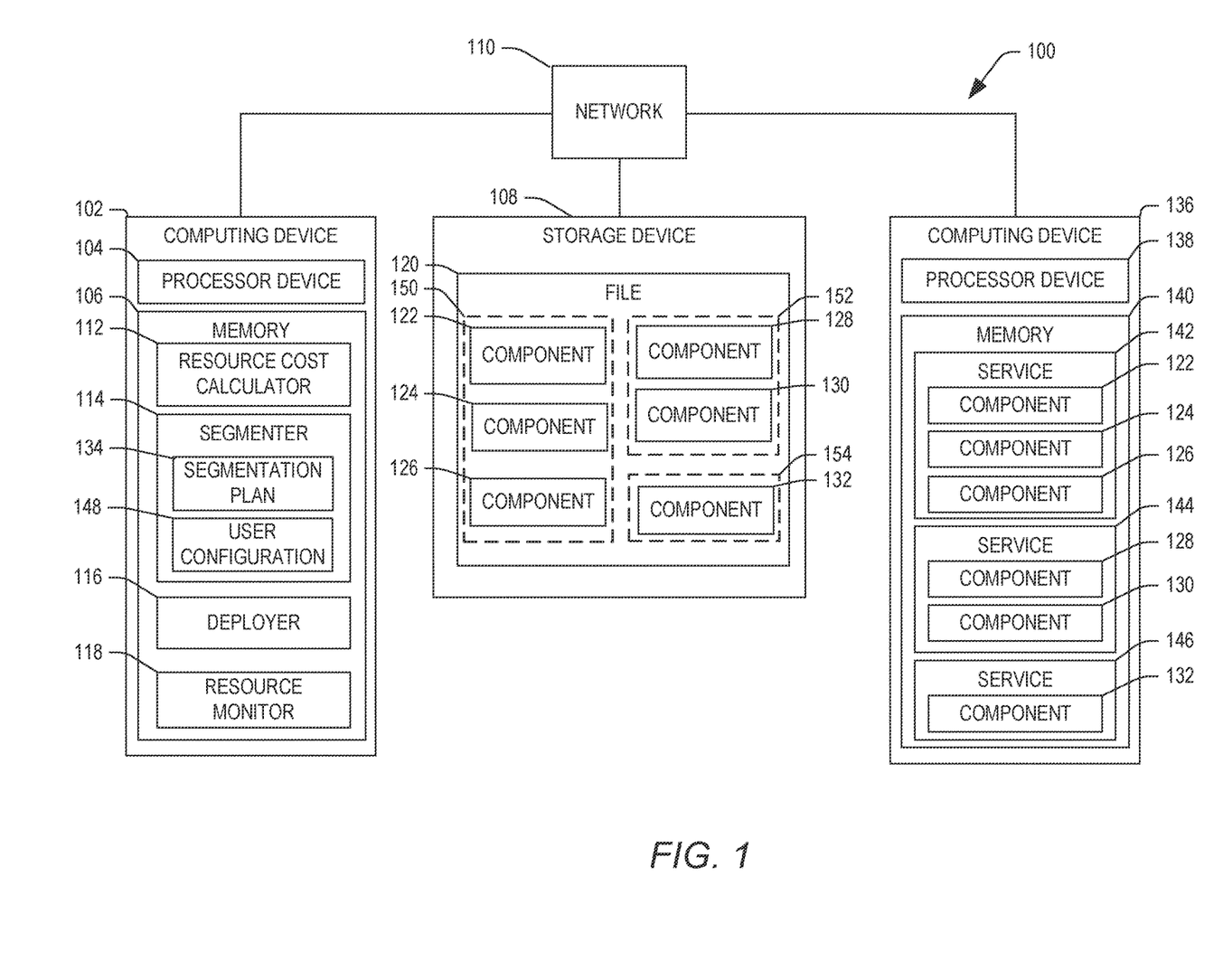
FIG. 1 illustrates a block diagram of an example computing system for segmenting processes into stand-alone services in accordance with various aspects of the subject disclosure.

Turning now to FIG. 1, illustrated is a block diagram of an example computing system 100 for segmenting processes. The computing system 100 includes a computing device 102, which in turn includes a processor device 104 and a memory 106. The computing device 102 may include, or be communicatively coupled to, a storage device 108. In some examples, the computing device 102 may access the storage device 108 via a network 110. The memory 106 can include a resource cost calculator 112, a segmenter 114, a deployer 116, and a resource monitor 118.

The storage device 108 can include a file 120 that comprises information associated with components 122, 124, 126, 128, 130, and 132 (generally, "components 122-132"). The segmenter 114 can create a segmentation plan 134 that segments the components 122-132 and a computing device 136 with a processor device 138 and a memory 140. The processor device 138 can execute services 142, 144, and 146 that perform or execute the processes associated with the components 122-132. In the example depicted in FIG. 1, the segmentation plan 134 can segment the components 122-132, based at least in part on user configuration information 148, into a first group 150 that includes the components 122-126, a second group 152 that includes the components 128 and 130, and a third group 154 that includes the component 132. The service 142 can execute the components that belong to the group 150; the service 144 can execute the components that belong to the group 152; and the service 146 can execute the components that belong to the group 154.

The file 120 can be in one or many different formats, using different modeling systems and/or notation systems. For example, the file 120 can be a DMN file, a BPMN file, a PMML file, a rules files written using DRL, or other type of file using other formats or notation systems. The DMN file can facilitate automated decisioning; the BPMN file can be used to encode business processes; the PMML file can be used to describe predictive models; and the DRL file can comprise information related to a business rule management system.

In an example, the resource cost calculator 112 can determine a first resource cost associated with deploying each of the components 122-132 in a respective service on one or more computing devices (e.g., the computing device 136). The resource cost calculator 112 can also determine a second resource cost associated with deploying each of the components 122-132 in a single service on the computing device 136. The first and the second resource cost can be a quantitative metric that is based on actual cost to operate (electrical utility expenses, server time, bandwidth) or based on computational resources utilized. The computational resources can include not just total computational resources (e.g., total processor usage, memory usage, etc.), but also relative computation resources such as the processor usage or memory usage as a percentage of what is available. The computational resources can also include bandwidth usage, latency of the respective services, and a length of time the service(s) will be estimated to operate.

The segmenter 114 can create a segmentation plan 134 that segments the components 122-132 into the groups 150-154, where each of the groups of components 150, 152, and 154 can be executed by the respective services 142, 144, and 146. The resource cost calculator 112 can verify that the segmentation plan 134 would result in a lower resource cost than either the first resource cost or the second resource cost.

In an example, the segmenter 114 can create the segmentation plan 134 based on the user configuration information 148. The user configuration information 148 can include information about how the output of the services 142, 144, and 146 will be utilized. The user configuration information 148 can also include information about user preferences such as whether accuracy or fault tolerance outweighs performance or vice versa. As an example, if fault tolerance is more important than performance, then the segmentation plan 134 can deploy important components (e.g., the component 132) to their own service (e.g., the service 146). Likewise, the segmentation plan 134 can ensure that multiple instances of the same service run in parallel.

The segmenter 114 can also create the segmentation plan 134 based on one or more resource constraints. For example, the resource cost calculator 112 can determine the resource cost of the segmentation plan 134 based on the number and type of computing devices available to operate the services 142, 144, and 146. For example, the segmenter 114 can assign components to groups or to computing devices (e.g., the computing device 136) based on the types of processes to be run by the services 142, 144, and 146. For example, if a component had a process that required graphics processing, the segmenter 114 could assign that component to a service running on a computing device that had one or more Graphics Processing Units (GPUs). Similarly, if a component had a process that required very little latency with respect to the end user(s) or to another process or another service, the segmenter 114 could ensure that the service executing this component was located on the same computing device, or on a computing device geographically close to the end user(s) or to the other computing devices. In an example, the user configuration information 148 can include information relating to the resource constraints.

In an example, the segmenter 114 can also create the segmentation plan 134 where one or more components can be serialized and downloaded onto a client device for offline execution (e.g., for Edge or Internet of Things use cases). When the client device comes back online, the client device can upload the results of the process.

In an example, the segmenter 114 can determine whether any of the components 122-132 include processes that have timers or require user input to proceed. These processes are generally not computationally intensive, but they may wait for input for some time. These processes may be deployed to stand-alone services in some examples, and in other examples, the service could be deployed as a serverless deployment, or where the service running that process is only instantiated when the process is required to perform an operation.

In an example, the segmenter 114 can determine whether any of the components 122-132 include script processes that are relatively simple and do not require a lot of processing; if there are two or more components such as the component 128 and the component 130 that include script processes, then these components can be grouped together in the service 144.

In an example, to determine whether a component includes a simple process, the segmenter 114 can check the length of code associated with each of the components 122-132. In other examples, the segmenter 114 can determine whether the code in any of the components 122-132 invoke any other functions, libraries, or other processes. If the length of code is longer than a predetermined length, or if there are one or more references to other components, the segmenter 114 can assign that component to a stand-alone service instead of grouping it with other components. In other examples, the segmenter 114 can determine whether the components 122-132 include any gateways which introduce diverging paths or parallel paths. The components that follow gateways can be broken down into separate services.

In another example, the segmenter 114 can utilize profile information or historical information to determine that one or more of the components 122-132 are not utilized frequently or intensely, and those components can be grouped together (e.g., the components 122-126 in the group 150).

Once the segmentation plan 134 has been generated, the deployer 116 can provide instructions to the computing device 136 to deploy the services 142-146 and also provide the code to the computing device 136 to execute the components 122-132 by the services 142-146. In an example, the deployer 116 can facilitate the instantiation of one or more containers or virtual machines to deploy the services 142-146.

A resource monitor 118 can monitor a resource usage of each of the services 142-146 during runtime, and if the resource usage of any of the services 142-146 exceeds a predetermined resource usage threshold, based on the resource constraints, the resource monitor 118 can send an indication to the segmenter 114 which can modify the segmentation plan 134, and the deployer 116 can provide instructions to implement the modified segmentation plan 134.

Because the resource cost calculator 112, the segmenter 114, the deployer 116, and the resource monitor 118 are components of the computing device 102, functionality implemented by the resource cost calculator 112, the segmenter 114, the deployer 116, and the resource monitor 118 may be attributed to the computing device 102 generally. Moreover, in examples where the resource cost calculator 112, the segmenter 114, the deployer 116, and the resource monitor 118 comprise software instructions that program a processor device (e.g., the processor device 104) to carry out functionality discussed herein, functionality implemented by the resource cost calculator 112, the segmenter 114, the deployer 116, and the resource monitor 118 may be attributed herein to the processor device 104 of the computing device 102.

Finally, it is noted that while, for purposes of illustration and simplicity, the examples are illustrated as being implemented by a computing system that comprises a single computing device that, in turn, comprises a single processor device. In practice the examples disclosed herein may be implemented in a computing system that comprises any number of computing devices, each of which may comprise one or more processor devices. Thus, irrespective of the implementation, the examples may be implemented on a computing system that includes one or more computing devices, wherein the one or more computing devices comprise one or more processor devices, and wherein the one or more processor devices are configured to implement functionality disclosed herein.

Figure 2:
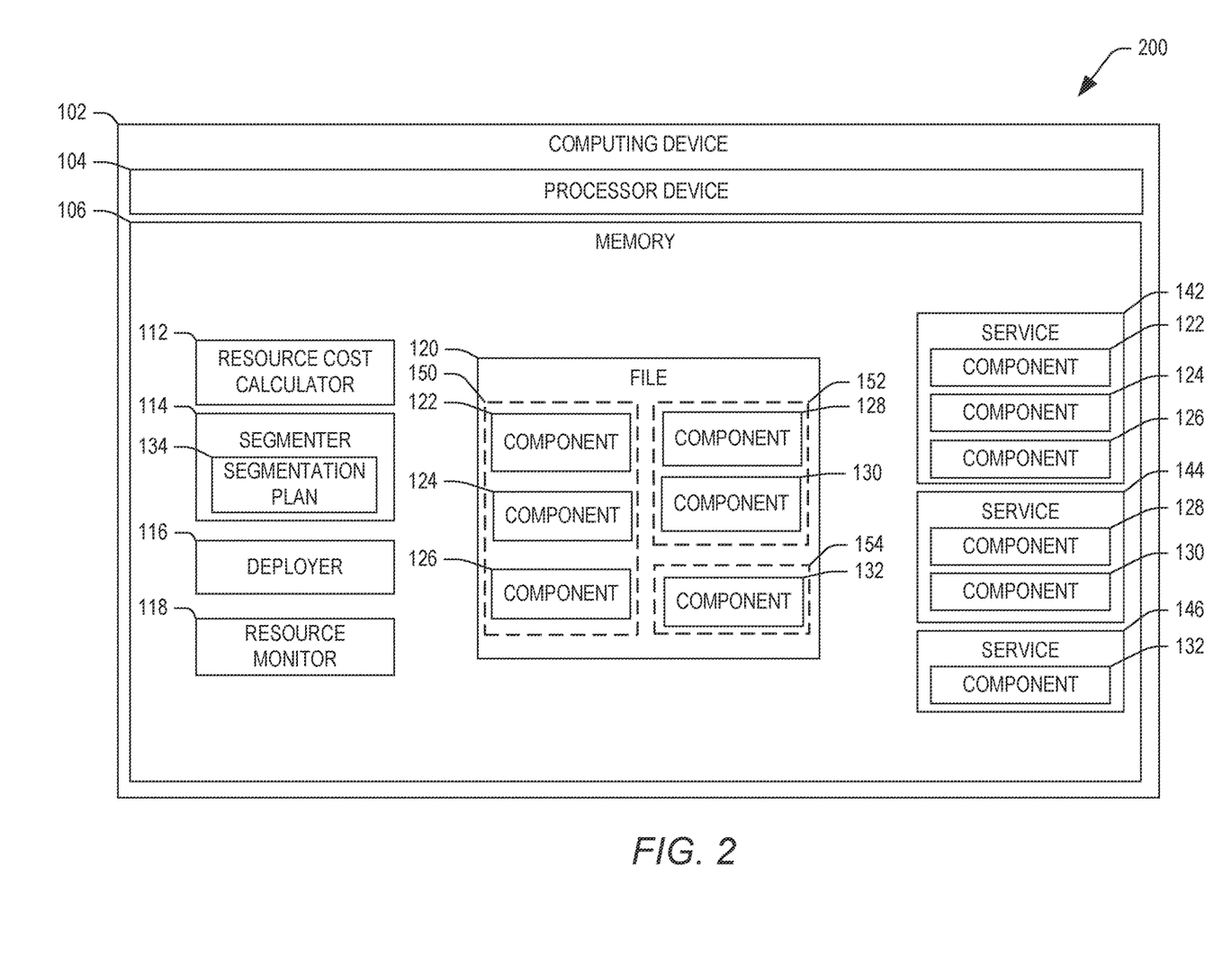
FIG. 2 illustrates a block diagram of an example computing system for segmenting processes into stand-alone services in accordance with various aspects of the subject disclosure.

Turning now to FIG. 2, illustrated is a block diagram of an example computing system 200 for segmenting processes into stand-alone services in accordance with various aspects of the subject disclosure. The computing system 200 in FIG. 2 depicts a different configuration of the computing system 100 shown in FIG. 1. Instead of the storage device 108 being separate from the computing device 102, and communicatively coupled via the network 110, in the example shown in FIG. 2, the file 120 can be stored in the memory 106 or in a storage device within the computing device 102. Additionally, the services 142-146 can also be operated by the computing device 102.

Figure 3:
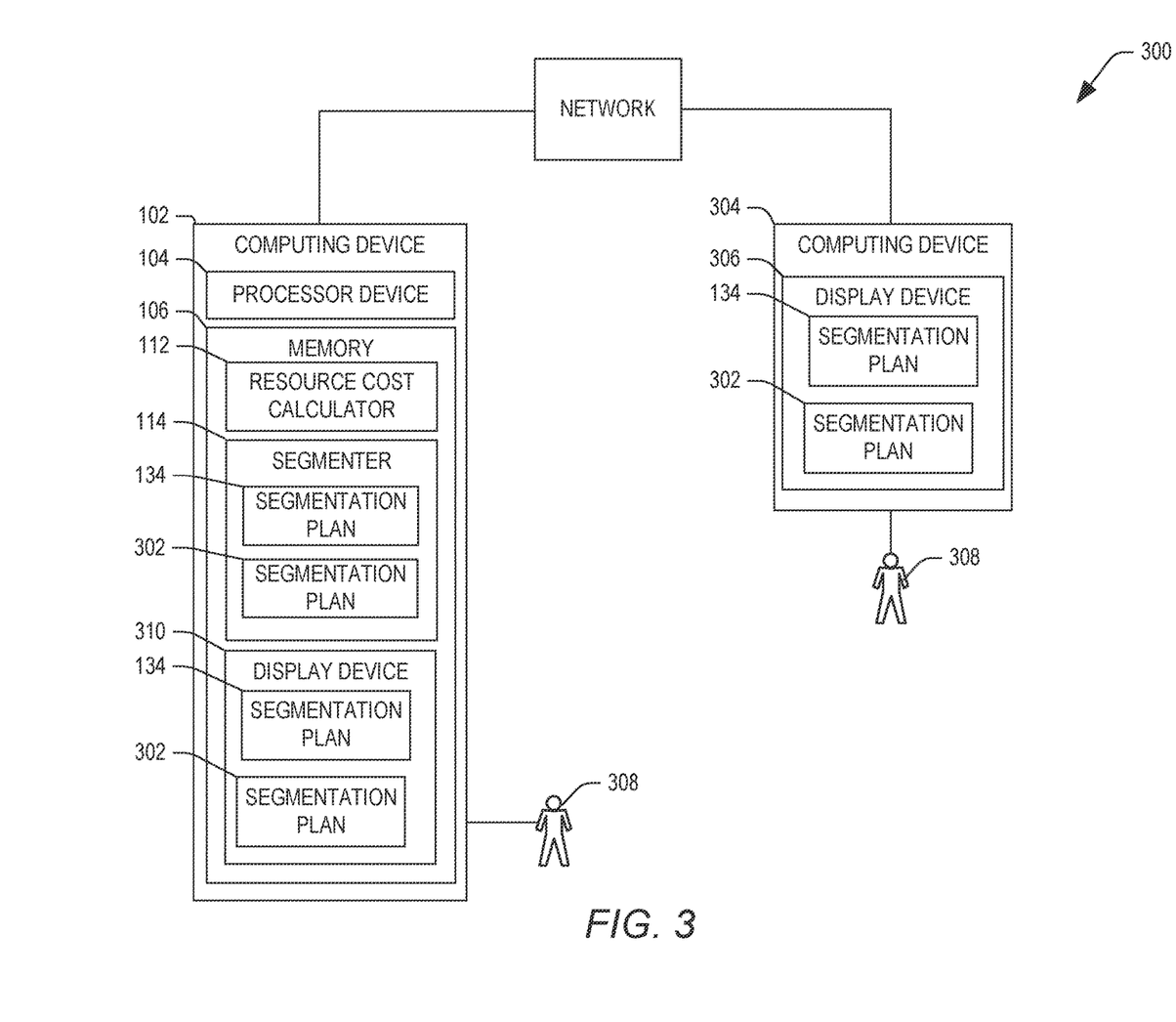
FIG. 3 illustrates a block diagram of an example computing system for segmenting processes into stand-alone services in accordance with various aspects of the subject disclosure.

In FIG. 3, illustrated is a block diagram of an example computing system 300 for segmenting processes into stand-alone services in accordance with various aspects of the subject disclosure.

In an example, the segmenter 114 can generate a plurality of segmentation plans (in this case, the segmentation plan 134 as well as a segmentation plan 302). The resource cost calculator 112 can estimate the resource costs of each of the segmentation plan 134 and the segmentation plan 302 to determine that their resource costs are below the first resource cost and the second resource cost. The segmentation plan 134 and the segmentation plan 302 can each include different combinations and numbers of groups of components.

In an example, the segmenter 114 can select the segmentation plan 134 or the segmentation plan 302 by selecting the segmentation plan with the lowest resource cost. In other examples, the segmenter 114 can select the segmentation based on user feedback. For example, the segmenter 114 can provide information about the segmentation plan 134 and the segmentation plan 302 to a computing device 304 that includes a display device 306 which can display information (see FIG. 4 for more detail) about the segmentation plan 134 and the segmentation plan 302. The computing device 304 can receive input from a user 308 about a selection, and the input can be transmitted back to the computing device 102 and the segmenter 114. In an example, the computing device 102 can include a display device 310 that can display the segmentation plan 134 and the segmentation plan 302, and the user 308 can select one of the segmentation plan 134 and the segmentation plan 302 on the display device 310.

Figure 4:
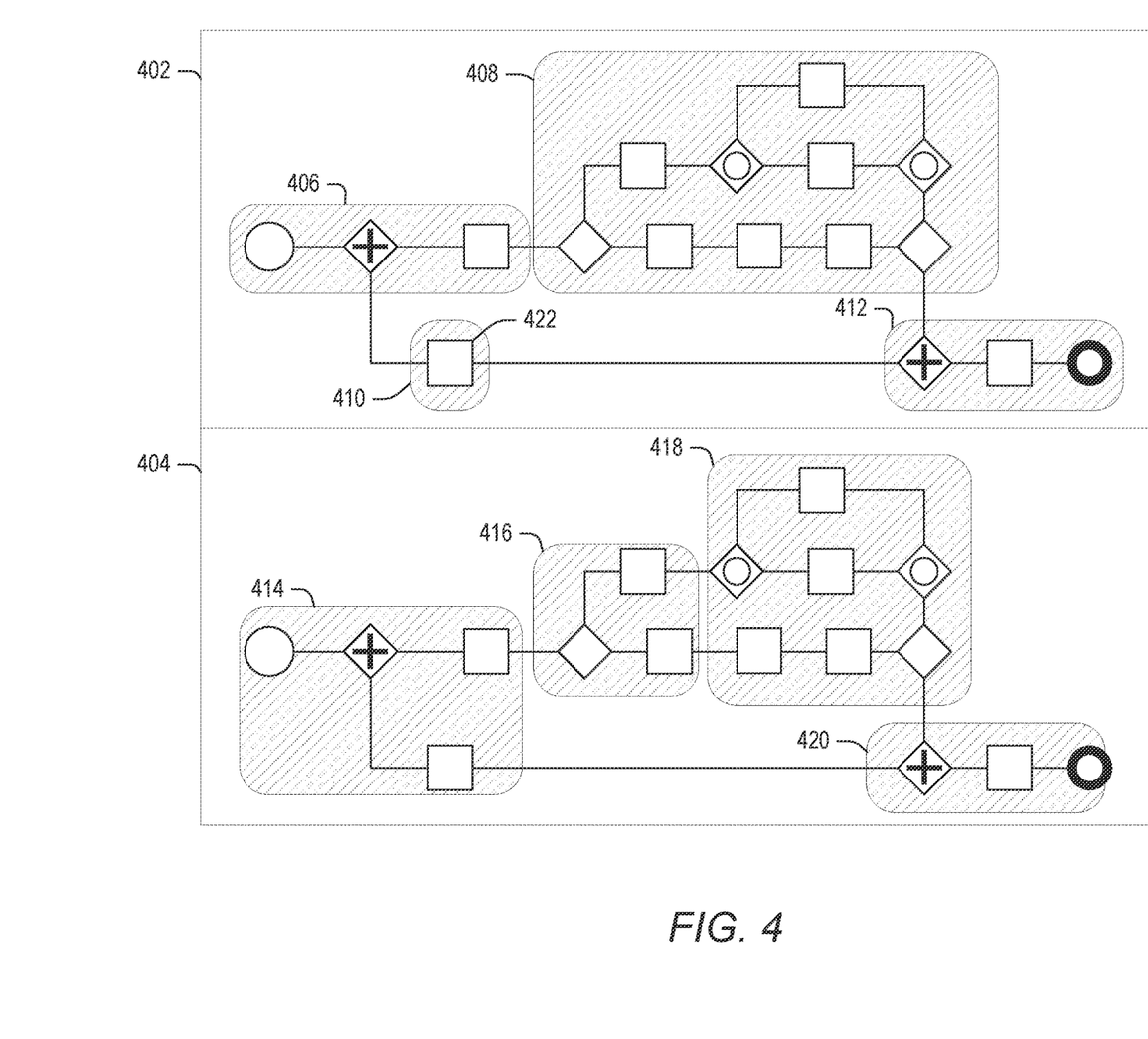
FIG. 4 illustrates a block diagram of suggested segmentation plans in accordance with various aspects of the subject disclosure.

Turning now to FIG. 4, illustrated is a block diagram of suggested segmentation plans in accordance with various aspects of the subject disclosure.

The suggested segmentation plans 402 and 404 can be graphical representations of segmentation plans similar to the segmentation plans 134 and 302 displayed on either of the display device 306 or the display device 310, and provide a visual indication of how the components can be grouped together. In an example, each of groups 406, 408, 410, 412 in the segmentation plan 402, and groups 414, 416, 418, and 420 in the segmentation plan 404 can be executed by respective services at runtime.

In an example, the segmentation plan 402 and the segmentation plan 404 can include a visual indicator of a resource usage for each component of the components shown in each of the segmentation plan 402 and the segmentation plan 404. For example, a component 422 can include a visual indicator indicating that there is a high resource usage or expected cost associated with the component 422, and for that reason, the segmenter 114 has assigned the component 422 to its own group 410. The visual indicator can be color coded with gradations in color representing different resource usages. The visual indicator could also be textual in some examples. In an example, the shading or color indicating the groups 406-420 can also vary indicating the expected resource usage of each of the groups.

Figure 5:
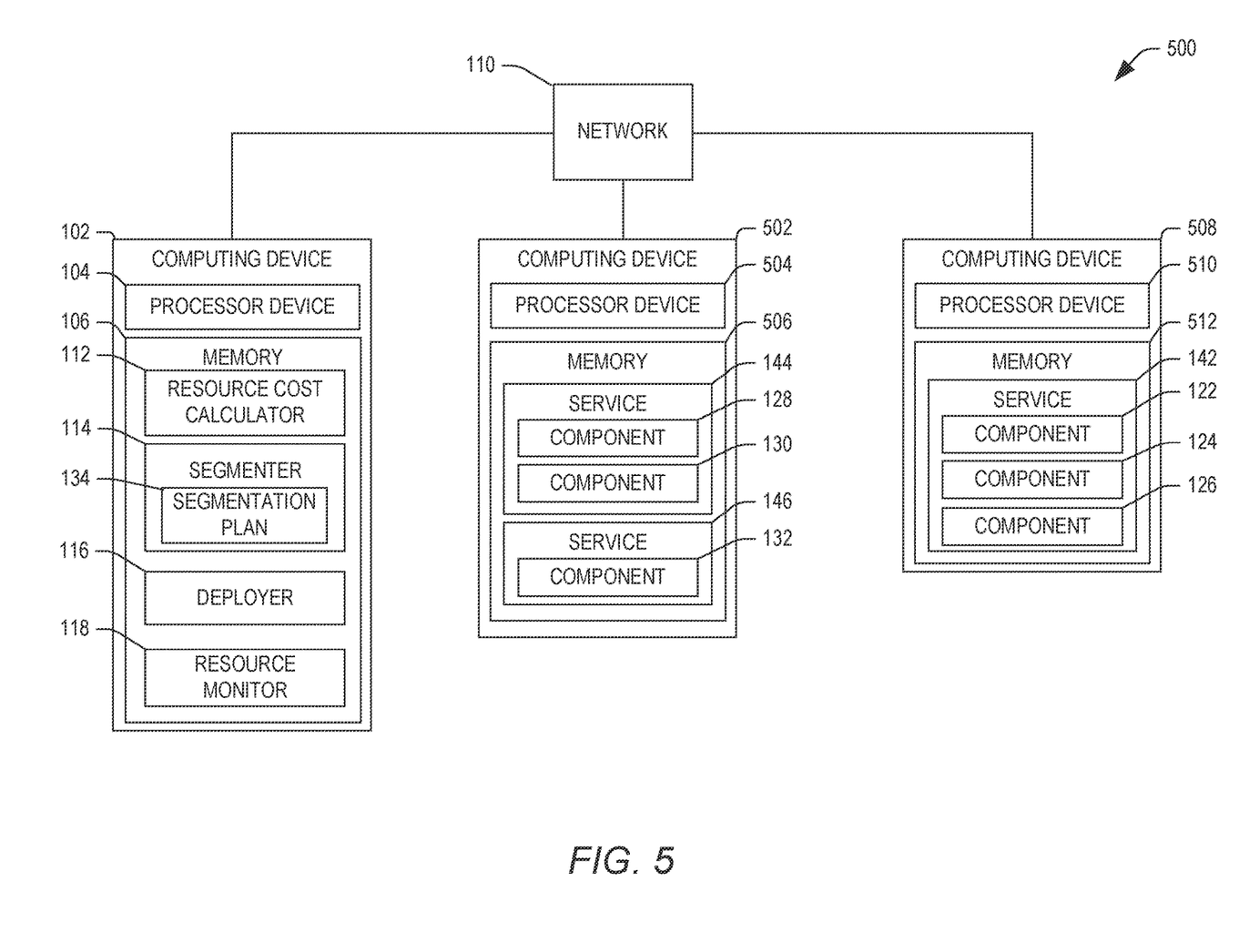
FIG. 5 illustrates a block diagram of an example computing system for segmenting processes into stand-alone services in accordance with various aspects of the subject disclosure.

Turning now to FIG. 5, illustrated is a block diagram of an example computing system 500 for segmenting processes into stand-alone services in accordance with various aspects of the subject disclosure.

In the example shown in FIG. 5, the segmentation plan 134 can have the services 144 and 146 deployed on a separate computing device than the service 142. For example, a computing device 502, which in turn includes a processor device 504 and a memory 506 can deploy the service 144 executing the components 128 and 130 and deploy the service 146 executing the component 132. A separate computing device 508, which in turn includes a processor device 510 and a memory 512 can deploy the service 142 executing the components 122, 124, and 126.

In an example, the components 122, 124, and 126 may require different computational resources than the components 128, 130, and 132, and are therefore being executed by the service 142 deployed on a different computing device from the services 144 and 146. In this example, the computing device 508 may have different capabilities (e.g., lower latency, higher memory, processing power, graphical processing capability, etc.) than the computing device 502.

Figure 6:
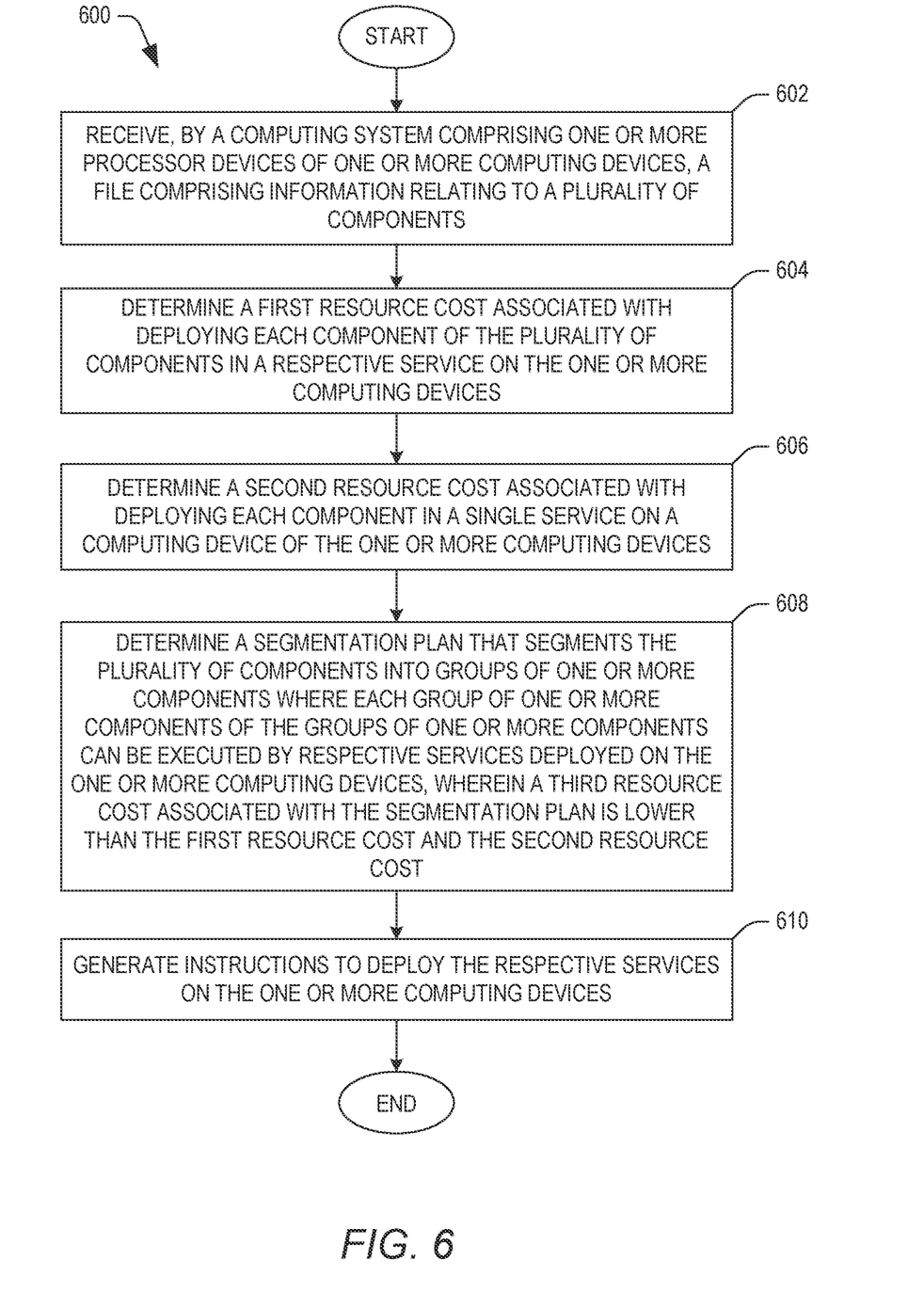
FIG. 6 illustrates a flowchart of an example method for segmenting processes into stand-alone services in accordance with various aspects of the subject disclosure.

FIG. 6 illustrates a process in connection with the aforementioned computing systems 100, 200, 300, or 500. FIG. 6 will be discussed in conjunction with FIG. 1. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 6, illustrated is a flowchart of an example method 600 for segmenting processes into stand-alone services in accordance with various aspects of the subject disclosure.

At step 602, the method 600 can include receiving, by a computing system comprising one or more processor devices (e.g., the processor device 104) of one or more computing devices (e.g., the computing device 102), the file 120 comprising information relating to a plurality of components 122-132.

At step 604, the method 600 can include determining a first resource cost (e.g., by the resource cost calculator 112) associated with deploying each of the components 122-132 in a respective service on the one or more computing devices (e.g., the computing device 136).

At step 606, the method 600 can include determining a second resource cost (e.g., by the resource cost calculator 112) associated with deploying each of the components 122-132 in a single service on the computing device 136 of the one or more computing devices.

At step 608, the method 600 can include determining a segmentation plan 134 (e.g., by the segmenter 114) that segments the plurality of components 122-132 into groups of one or more components (e.g., the groups 150, 152, and 154) where each group of one or more components of the groups of one or more components can be executed by the respective services 142, 144, and 146 deployed on the computing device 136, wherein a third resource cost associated with the segmentation plan 134 is lower than the first resource cost and the second resource cost.

At step 610, the method 600 can include generating instructions (e.g., by the deployer 116) to deploy the respective services 142, 144, and 146 on the computing device 136.

Figure 7:
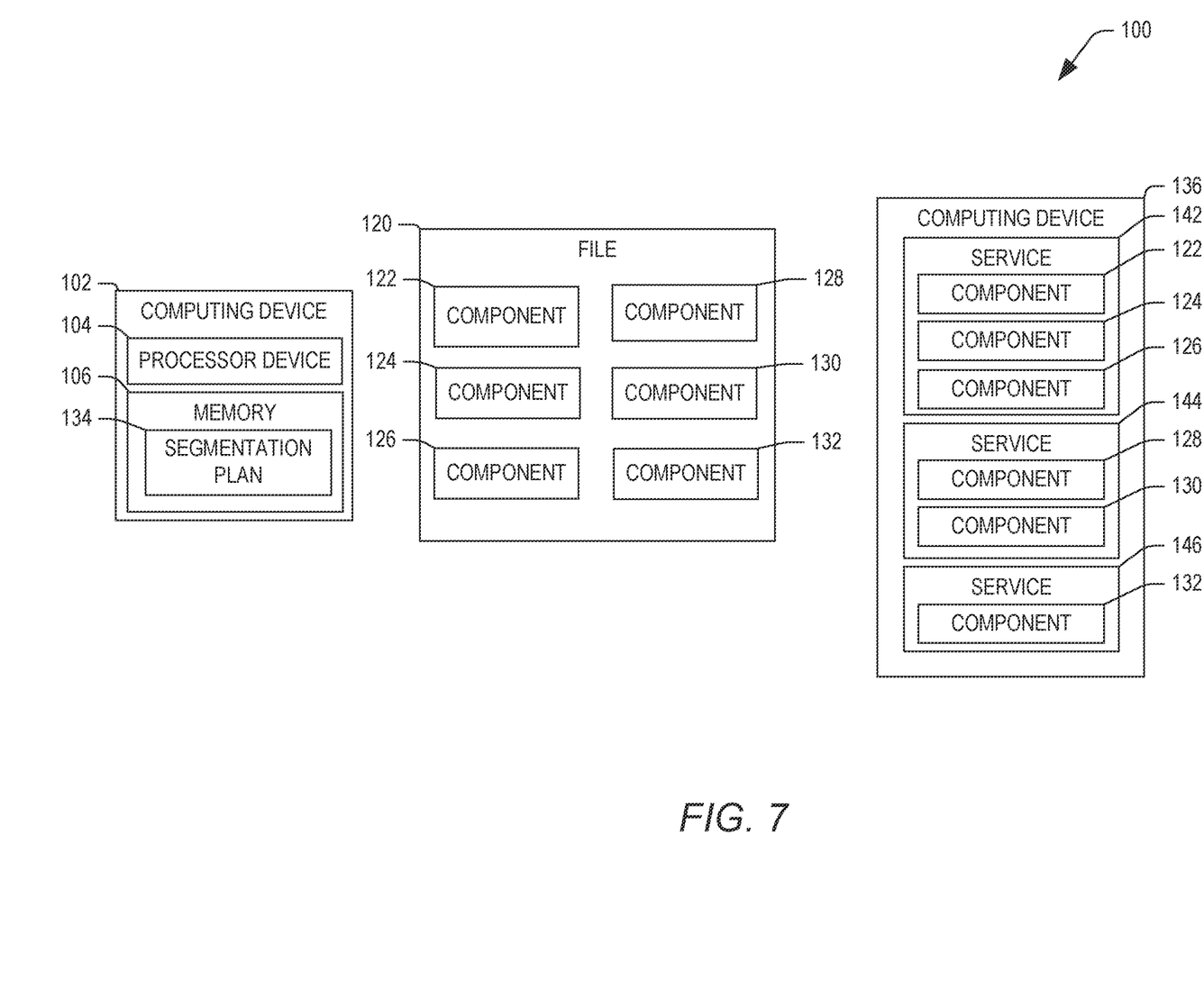
FIG. 7 illustrates a simplified block diagram of the computing system illustrated in FIG. 1 in accordance with various aspects of the subject disclosure.

FIG. 7 is a simplified block diagram of the computing system 100 illustrated in FIG. 1 in accordance with various aspects of the subject disclosure. The computing system 100 includes the computing device 102 that includes the memory 106 coupled to the processor device 104. The processor device 104 is to receive the file 120 that comprises information relating to the components 122-132. The processor device 104 is further to determine a first resource cost associated with deploying each of the components 122-132 in a respective service on the one or more computing devices (e.g., the computing device 136). The processor device 104 is further to determine a second resource cost associated with deploying each of the components 122-132 in a single service on the computing device 136. The processor device 104 is further to determine the segmentation plan 134 that segments the plurality of components 122-132 into groups of one or more components where each group of one or more components of the groups of one or more components can be executed by respective services (e.g., the services 142, 144, and 146) deployed on the computing device 136, wherein a third resource cost associated with the segmentation plan 134 is lower than the first resource cost and the second resource cost. The processor device 104 is further to generate instructions to deploy the respective services 142, 144, and 146 on the computing device 136.

Figure 8:
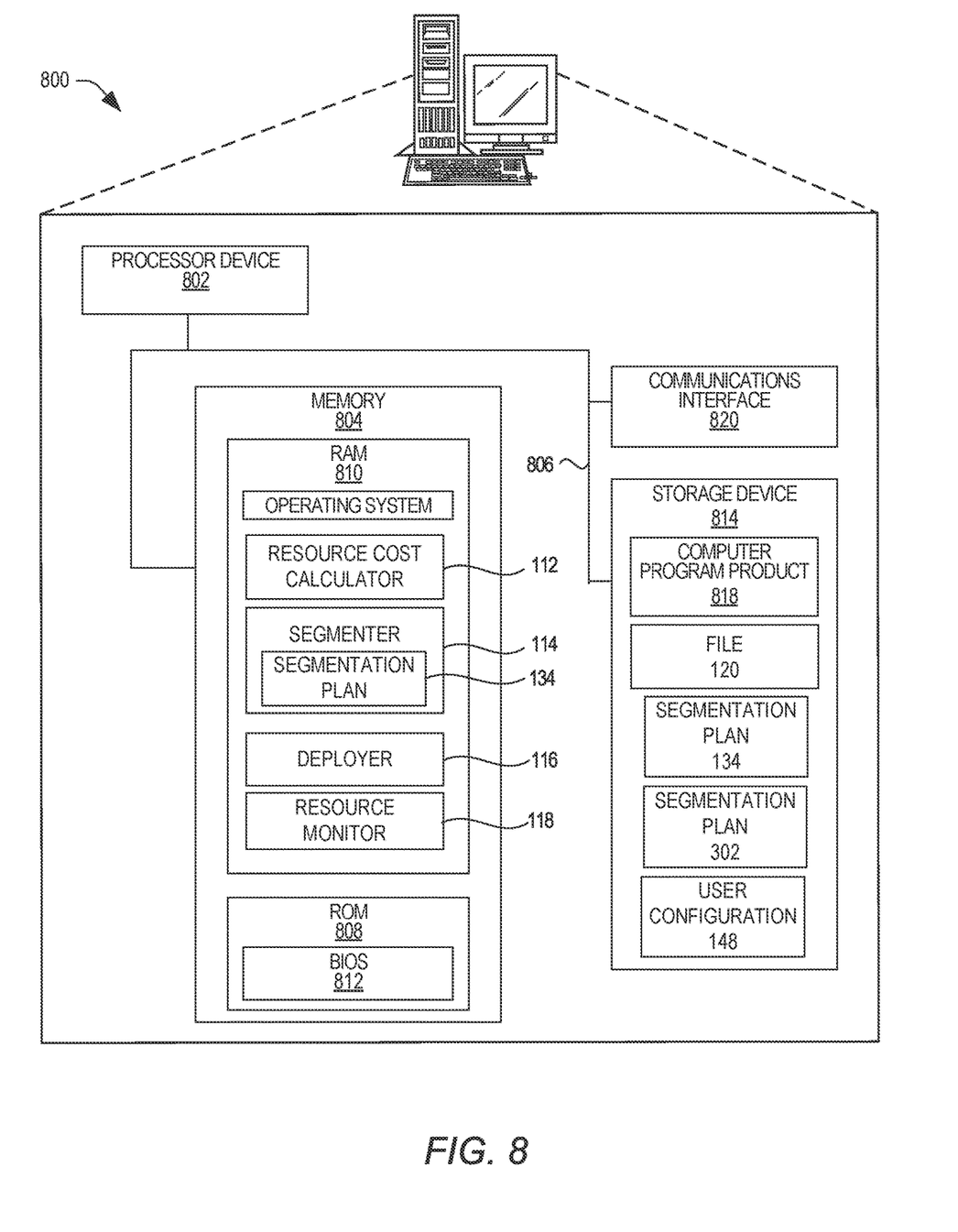
FIG. 8 illustrates an example block diagram of a computer that can be operable to execute processes and methods in accordance with various aspects of the subject disclosure.

FIG. 8 is a block diagram of a computing device 800 suitable for implementing the computing device 102 according to one example. The computing device 800 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 800 includes a processor device 802, a system memory 804, and a system bus 806. The system bus 806 provides an interface for system components including, but not limited to, the system memory 804 and the processor device 802. The processor device 802 can be any commercially available or proprietary processor.

The system bus 806 may be any of several types of bus structures that may further interconnect to a memory bus (with or without a memory controller), a peripheral bus, and/or a local bus using any of a variety of commercially available bus architectures. The system memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)). A basic input/output system (BIOS) 812 may be stored in the non-volatile memory 808 and can include the basic routines that help to transfer information between elements within the computing device 800. The volatile memory 810 may also include a high-speed RAM, such as static RAM, for caching data.

The computing device 800 may further include or be coupled to a non-transitory computer-readable storage medium such as a storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 814 and in the volatile memory 810, including an operating system and one or more components, such as the resource cost calculator 112, the segmenter 114 and the segmentation plan 134, the deployer 116, and the resource monitor 118 if the computing device 800 is implementing the computing device 102. Such components may implement the functionality described herein in whole or in part. It is to be appreciated that the examples can be implemented with various commercially available operating systems or combinations of operating systems.

The file 120, the segmentation plans 134 and 302 and the user configuration information 148 can also be stored in the storage device 814. All or a portion of the examples may be implemented as a computer program product 818 stored on a transitory or non-transitory computer-usable or computer-readable storage medium, such as the storage device 814, which includes complex programming instructions, such as complex computer-readable program code, to cause the processor device 802 to carry out the steps described herein. Thus, the computer-readable program code can comprise software instructions for implementing the functionality of the examples described herein when executed on the processor device 802.

The computing device 800 may also include a communications interface 820 suitable for communicating with a mobile wireless network or other computing devices as appropriate or desired.

Those skilled in the art will recognize improvements and modifications to the preferred examples of the disclosure.

All such improvements and modifications are considered within the scope of the concepts disclosed herein and the claims that follow.

What is claimed is:

1. A method comprising:
receiving, by a computing system comprising one or more processor devices of one or more computing devices, a file comprising information relating to a plurality of components, wherein a first component of the plurality of components comprises component code comprising computer-readable software instructions;
determining, by the computing system, a first computational resource cost associated with deploying each component in a respective service on the one or more computing devices, the first computational resource cost taking into consideration one or more computational resources;
determining, by the computing system, a second computational resource cost associated with deploying each component of the plurality of components in a single service on a computing device of the one or more computing devices, the second computational resource cost taking into consideration the one or more computational resources;
based on the component code, determining, by the computing system, a computational resource constraint associated with the first component of the plurality of components, wherein the computational resource constraint comprises a particular type of computational resource required to implement the first component;
based on the computational resource constraint, determining, by the computing system, a segmentation plan that segments the plurality of components into groups of one or more components where each group of one or more components of the groups of one or more components can be executed by respective services deployed on the one or more computing devices, at least one of the groups comprising at least two components, wherein a third computational resource cost associated with the segmentation plan is lower than the first computational resource cost and the second computational resource cost, the third computational resource cost taking into consideration the one or more computational resources, wherein the segmentation plan assigns a first group comprising the first component to a service deployed on a first computing device of the one or more computing devices, wherein the first computing device comprises a first computational resource of particular computational resource type from the one or more computational resources;
generating, by the computing system, instructions to deploy the respective services on the one or more computing devices based on the segmentation plan, wherein the segmentation plan identifies a plurality of the one or more computing devices;
causing, by the computing system, based on the instructions, code that corresponds to components that are to be executed on each respective computing device of the plurality of the one or more computing devices to be sent to the respective computing device; and
causing, by the computing system, based on the instructions, the components to be executed on each respective computing device of the plurality of the one or more computing devices.

2. The method of claim 1, further comprising:
determining a plurality of segmentation plans each segmentation plan having computational resource costs below the first computational resource cost and the second computational resource cost and each segmentation plan segmenting the plurality of components into different combinations of the groups of one or more components;
transmitting information relating to the plurality of segmentation plans to a display device; and
receiving an indication of a user selection of the segmentation plan from the plurality of segmentation plans.

3. The method of claim 2, wherein a visual representation of each segmentation plan of the plurality of segmentation plans is configured to be displayed on the display device.

4. The method of claim 3, wherein the visual representation comprises an indication of a resource usage of each component of the plurality of components.

5. The method of claim 1, wherein determining the segmentation plan further comprises:
generating a plurality of segmentation plans that segment the plurality of components into different combinations of the groups of one or more components;
calculating resource costs of the plurality of segmentation plans by calculating a computational resource cost for each segmentation plan of the plurality of segmentation plans; and
selecting the segmentation plan, wherein the segmentation plan has a lowest computational resource cost of the computational resource costs of the plurality of segmentation plans.

6. The method of claim 1, further comprising:
during runtime of the respective services deployed on the plurality of the one or more computing devices:
monitoring a resource usage associated with the respective services;
determining that the resource usage exceeds a resource usage threshold;
modifying the segmentation plan, resulting in a modified segmentation plan, based on the resource usage exceeding the resource usage threshold; and
generating instructions to implement the modified segmentation plan.

7. The method of claim 1, wherein the file is a Business Process Model Notation (BPMN) file, and the plurality of components are processes associated with a business process.

8. The method of claim 1, further comprising:
calculating the third computational resource cost based at least in part on a server usage cost, a bandwidth cost, latency of the respective services, operation time of the respective services, and the computational resource constraint.

9. The method of claim 8, wherein the computational resource constraint is further based at least in part on a resource availability and a user configuration.

10. The method of claim 1, wherein at least one service of the respective services is a serverless deployment.

11. A computing system comprising:
one or more computing devices, the one or more computing devices comprising one or more processor devices, the one or more processor devices to:
receive a file comprising information relating to a plurality of components, wherein a first component of the plurality of components comprises component code comprising computer-readable software instructions;
determine a first computational resource cost associated with deploying each component of the plurality of components in a respective service on the one or more computing devices, the computational first resource cost taking into consideration one or more computational resources;

determine a second computational resource cost associated with deploying each component in a single service on a computing device of the one or more computing devices, the second computational resource cost taking into consideration the one or more computational resources;

based on the component code, determine a computational resource constraint associated with the first component of the plurality of components, wherein the computational resource constraint comprises a particular type of computational resource required to implement the first component;

based on the computational resource constraint, determine a segmentation plan that segments the plurality of components into groups of one or more components where each group of one or more components of the groups of one or more components can be executed by respective services deployed on the one or more computing devices, at least one of the groups comprising at least two components, wherein a third computational resource cost associated with the segmentation plan is lower than the first computational resource cost and the second computational resource cost, the third computational resource cost taking into consideration the one or more computational resources, wherein the segmentation plan assigns a first group comprising the first component to a service deployed on a first computing device of the one or more computing devices, wherein the first computing device comprises a first computational resource of particular computational resource type from the one or more computational resources;

generate instructions to deploy the respective services on the one or more computing devices based on the segmentation plan, wherein the segmentation plan identifies a plurality of the one or more computing devices;

cause, based on the instructions, code that corresponds to components that are to be executed on each respective computing device of the plurality of the one or more computing devices to be sent to the respective computing device; and cause, based on the instructions, the components to be executed on each respective computing device of the plurality of the one or more computing devices.

12. The computing system of claim 11, wherein the one or more processor devices further:

determine a plurality of segmentation plans each segmentation plan having computational resource costs below the first computational resource cost and the second computational resource cost and each segmentation plan segmenting the plurality of components into different combinations of the groups of one or more components;

transmit information relating to the plurality of segmentation plans to a display device; and receive an indication of a user selection of the segmentation plan from the plurality of segmentation plans.

13. The computing system of claim 12, wherein a visual representation of each segmentation plan of the plurality of segmentation plans is configured to be displayed on the display device.

14. The computing system of claim 13, wherein the visual representation comprises an indication of a resource usage of each component of the plurality of components.

15. The computing system of claim 11, wherein the one or more processor devices further:

generate a plurality of segmentation plans that segment the plurality of components into different combinations of the groups of one or more components;

calculate resource costs of the plurality of segmentation plans by calculating a computational resource cost for each segmentation plan of the plurality of segmentation plans; and select the segmentation plan, wherein the segmentation plan has a lowest computational resource cost of the computational resource costs of the plurality of segmentation plans.

16. The computing system of claim 11, wherein the one or more processor devices further:

during runtime of the respective services deployed on the plurality of the one or more computing devices:
monitor a resource usage associated with the respective services;
determine that the resource usage exceeds a resource usage threshold;
modify the segmentation plan, resulting in a modified segmentation plan, based on the resource usage exceeding the resource usage threshold; and
generate instructions to implement the modified segmentation plan.

17. The computing system of claim 11, wherein the one or more processor devices further:

calculate the third computational resource cost based at least in part on a server usage cost, a bandwidth cost, latency of the respective services, operation time of the respective services, and the computational resource constraint.

18. The computing system of claim 17, wherein the computational resource constraint is based at least in part on a resource availability and a user configuration.

19. The computing system of claim 11, wherein the file is a Business Process Model Notation (BPMN) file, and the plurality of components are processes associated with a business process.

20. A non-transitory computer-readable storage medium that includes executable instructions to cause one or more processor devices of one or more computing devices to:

receive a file comprising information relating to a plurality of components, wherein a first component of the plurality of components comprises component code comprising computer-readable software instructions;

determine a first computational resource cost associated with deploying each component of the plurality of components in a respective service on the one or more computing devices, the first computational resource cost taking into consideration one or more computational resources;

determine a second computational resource cost associated with deploying each component in a single service on a computing device of the one or more computing devices, the second computational resource cost taking into consideration the one or more computational resources;

based on the component code, determine a computational resource constraint associated with the first component of the plurality of components, wherein the computational resource constraint comprises a particular type of computational resource required to implement the first component based on the computational resource constraint, determine a segmentation plan that segments the plurality of components into groups of one or more components where each group of one or more components of the groups of one or more components can be executed by respective services deployed on the one or more computing devices, at least one of the groups comprising at least two components, wherein a third computational resource cost associated with the segmentation plan is lower than the computational first resource cost and the second computational resource cost, the third computational resource cost taking into consideration the one or more computational resources, wherein the segmentation plan assigns a first group comprising the first component to a service deployed on a first computing device of the one or more computing devices, wherein the first computing device comprises a first computational resource of particular computational resource type from the one or more computational resources;

generate instructions to deploy the respective services on the one or more computing devices based on the segmentation plan, wherein the segmentation plan identifies a plurality of the one or more computing devices;

cause, based on the instructions, code that corresponds to components that are to be executed on each respective computing device of the plurality of the one or more computing devices to be sent to the respective computing device; and cause, based on the instructions, the components to be executed on each respective computing device of the plurality of the one or more computing devices.

* * * * *